(12) United States Patent
Reigis

(10) Patent No.: US 12,032,901 B1
(45) Date of Patent: Jul. 9, 2024

(54) ENABLING SECURE AUTO-FILLING OF INFORMATION

(71) Applicant: UAB 360 IT, Vilnius (LT)

(72) Inventor: Justinas Reigis, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 18/200,533

(22) Filed: May 22, 2023

(51) Int. Cl.
*G06F 40/174* (2020.01)
*G06F 8/75* (2018.01)

(52) U.S. Cl.
CPC .............. *G06F 40/174* (2020.01); *G06F 8/75* (2013.01)

(58) Field of Classification Search
CPC ................................. G06F 40/174; G06F 8/75
See application file for complete search history.

(56) References Cited

U.S. PATENT DOCUMENTS

| | | | |
|---|---|---|---|
| 2012/0063684 A1* | 3/2012 | Denoue | G06V 30/412 382/175 |
| 2018/0181866 A1* | 6/2018 | Dalle | G06N 20/00 |
| 2023/0153650 A1* | 5/2023 | Mossoba | G06F 40/174 706/12 |

* cited by examiner

*Primary Examiner* — Kyle R Stork
(74) *Attorney, Agent, or Firm* — The Pattani Law Group

(57) ABSTRACT

A system is disclosed in which an infrastructure device analyzes a source code associated with a known network element to determine a characteristic associated with a field portion that is configured to accept a known type of input information; determines a correlation between the characteristic and the known type of input information; calculates a training signature to classify the field portion; trains an ML model based on the training signature; and transmits a trained ML model to a user device. The user device analyzes an observed source code associated with an observed network element to determine an observed characteristic associated with an observed field portion that is configured to accept a given type of input information; calculates an observed signature; utilizes the trained ML model to determine the given type of input information; and auto-fills, in the observed field portion, input information according to the given type of input information.

20 Claims, 7 Drawing Sheets

400 →

By an infrastructure device,

410 — Analyzing a source code associated with a known network element to determine a characteristic associated with an included field portion that is configured to accept a known type of input information;

420 — Determining a correlation between the determined characteristic and the known type of input information;

430 — Calculating, based at least in part on the correlation, a training signature that uniquely indicates a classification of the field portion as a field portion that accepts the known type of input information;

440 — Training a machine learning (ML) model based at least in part on utilizing the training signature as training data;

450 — Transmitting, to a user device, a trained ML model

By a user device,

460 — Analyzing an observed source code associated with an observed network element to determine an observed characteristic associated with an observed field portion that is configured to accept a given type of input information;

470 — Calculating an observed signature associated with the observed field portion based at least in part on the observed characteristic;

480 — Utilizing the trained machine learning model to evaluate the observed signature to determine the given type of input information; and 490 — Auto-filling, in the observed field portion, input information in accordance with the given type of input information

ENABLING SECURE AUTO-FILLING OF INFORMATION

FIELD OF DISCLOSURE

Aspects of the present disclosure generally relate to cyber security, and more particularly to enabling secure auto-filling of information.

BACKGROUND

A user device may rely on a network to communicate information and/or to communicate messages with another user device. Such information and/or messages may include private information and/or sensitive data associated with the user device. The communication over the network may be vulnerable as being susceptible to a cybercrime, through which a malicious entity may attempt to steal, alter, disable, expose, or destroy the information through unauthorized access to the communicating user devices. A cybercrime may include, for example, a malware attack, a phishing attack, a ransomware attack, a virus attack, etc. As a result, cyber security measures may be used to prevent occurrence of the cybercrime and/or to mitigate risks associated with the cybercrime.

SUMMARY

In one aspect, the present disclosure contemplates a method including analyzing, by an infrastructure device, a source code associated with a known network element to determine a characteristic associated with an included field portion that is configured to accept a known type of input information; determining, by the infrastructure device, a correlation between the determined characteristic and the known type of input information; calculating, by the infrastructure device based at least in part on the correlation, a training signature that uniquely indicates a classification of the field portion as a field portion that accepts the known type of input information; training, by the infrastructure device, a machine learning (ML) model based at least in part on utilizing the training signature as training data; transmitting, by the infrastructure device to a user device, a trained ML model; analyzing, by the user device, an observed source code associated with an observed network element to determine an observed characteristic associated with an observed field portion that is configured to accept a given type of input information; calculating, by the user device, an observed signature associated with the observed field portion based at least in part on the observed characteristic; utilizing, by the user device, the trained machine learning model to evaluate the observed signature to determine the given type of input information; and auto-filling, by the user device in the observed field portion, input information in accordance with the given type of input information.

In another aspect, the present disclosure contemplates a system including an infrastructure device and a user device, wherein the infrastructure device is configured to analyze a source code associated with a known network element to determine a characteristic associated with an included field portion that is configured to accept a known type of input information; determine a correlation between the determined characteristic and the known type of input information; calculate, based at least in part on the correlation, a training signature that uniquely indicates a classification of the field portion as a field portion that accepts the known type of input information; train a machine learning (ML) model based at least in part on utilizing the training signature as training data; and transmit, to the user device, a trained ML model, and the user device is configured to analyze an observed source code associated with an observed network element to determine an observed characteristic associated with an observed field portion that is configured to accept a given type of input information; calculate an observed signature associated with the observed field portion based at least in part on the observed characteristic; utilize the trained machine learning model to evaluate the observed signature to determine the given type of input information; and auto-fill, in the observed field portion, input information in accordance with the given type of input information.

In another aspect, the present disclosure contemplates a non-transitory computer readable medium storing instructions, which when executed by an infrastructure device, configure the infrastructure device to: analyze a source code associated with a known network element to determine a characteristic associated with an included field portion that is configured to accept a known type of input information; determine a correlation between the determined characteristic and the known type of input information; calculate, based at least in part on the correlation, a training signature that uniquely indicates a classification of the field portion as a field portion that accepts the known type of input information; train a machine learning (ML) model based at least in part on utilizing the training signature as training data; and transmit, to the user device, a trained ML model, and which when executed by the user device, configure the user device to: analyze an observed source code associated with an observed network element to determine an observed characteristic associated with an observed field portion that is configured to accept a given type of input information; calculate an observed signature associated with the observed field portion based at least in part on the observed characteristic; utilize the trained machine learning model to evaluate the observed signature to determine the given type of input information; and auto-fill, in the observed field portion, input information in accordance with the given type of input information.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
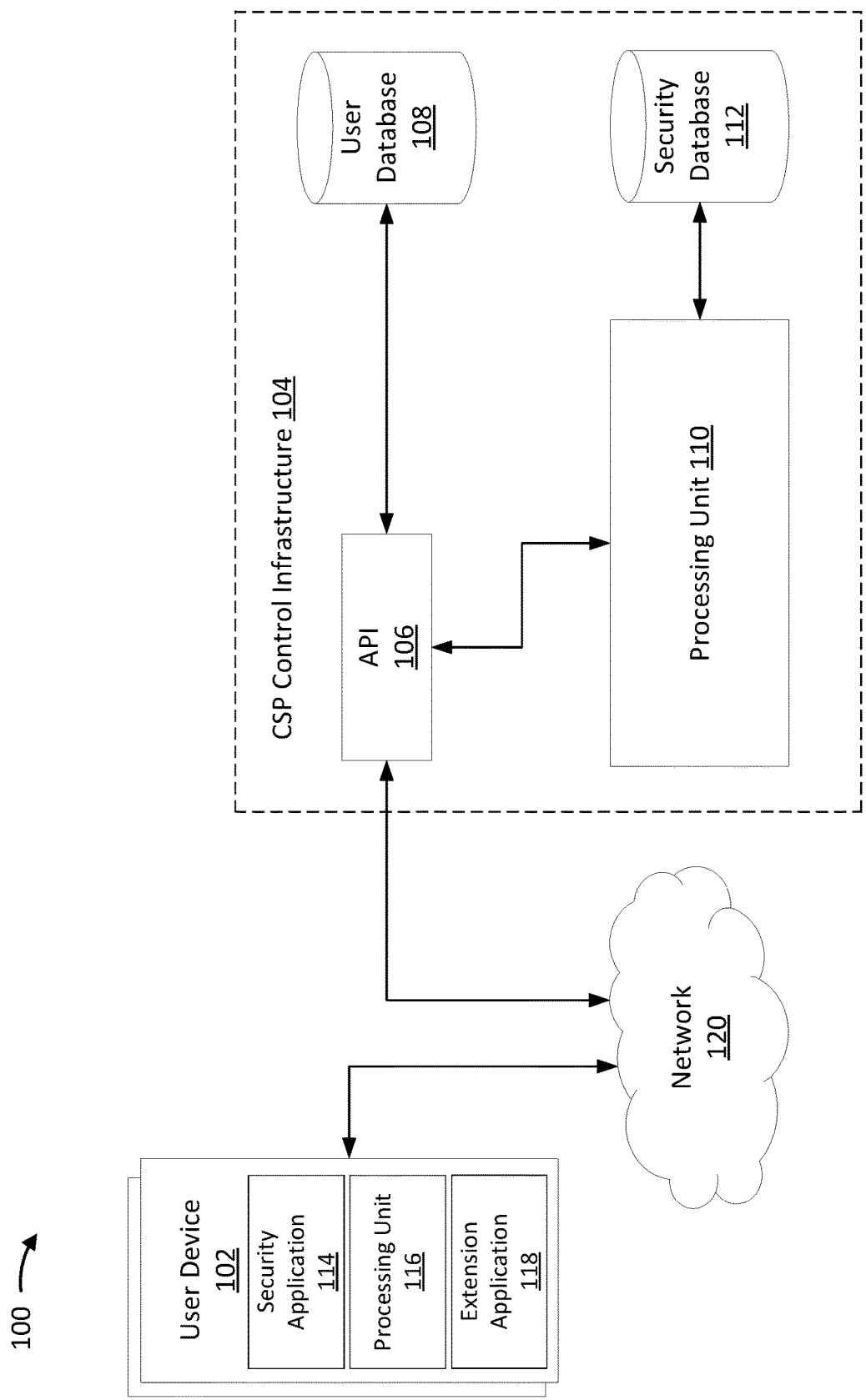

FIG. 1 is an illustration of an example system associated with enabling secure auto-filling of information, according to various aspects of the present disclosure.

Figure 2:
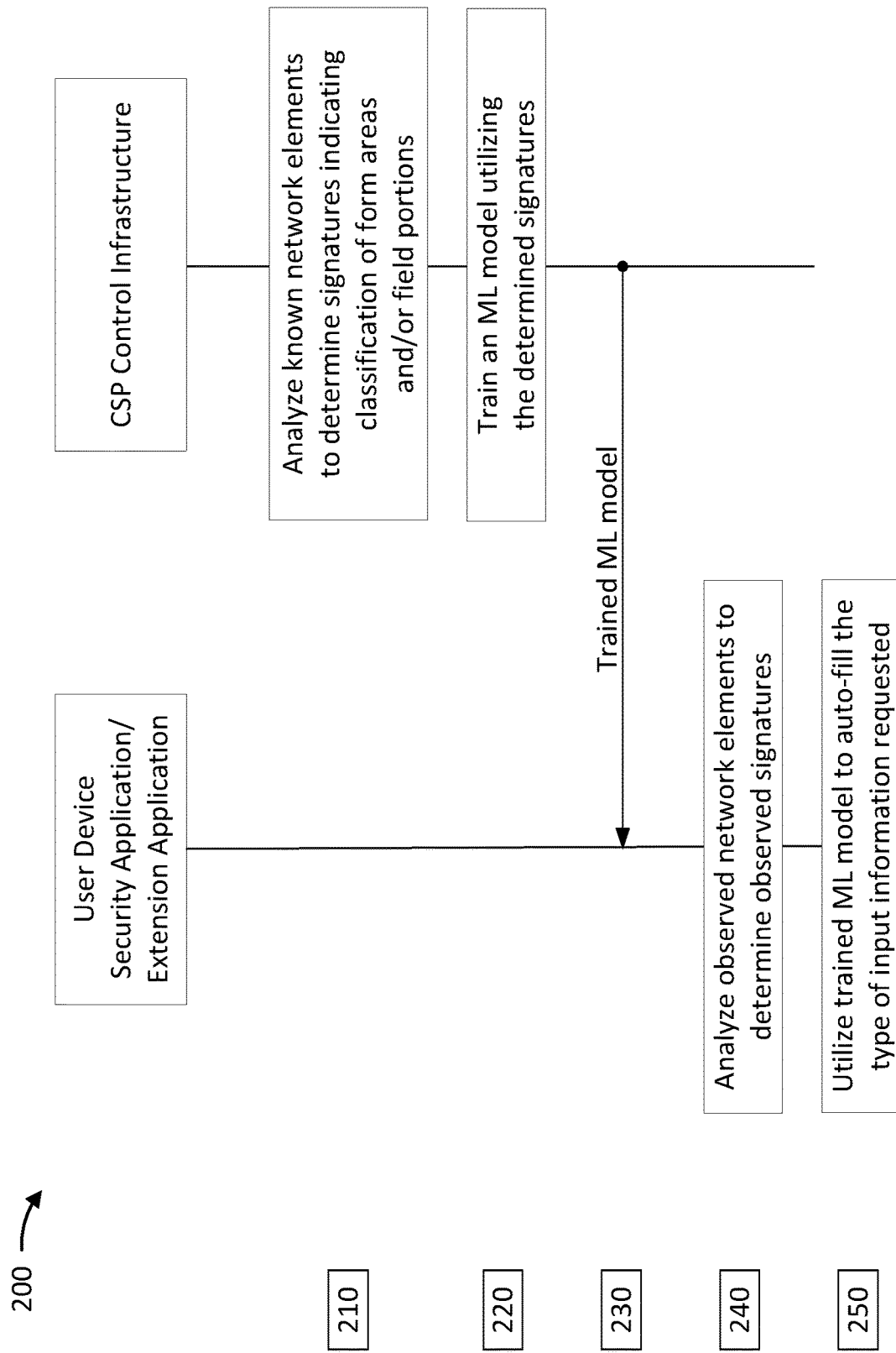

FIG. 2 is an illustration of an example flow associated with enabling secure auto-filling of information, according to various aspects of the present disclosure.

Figure 3:
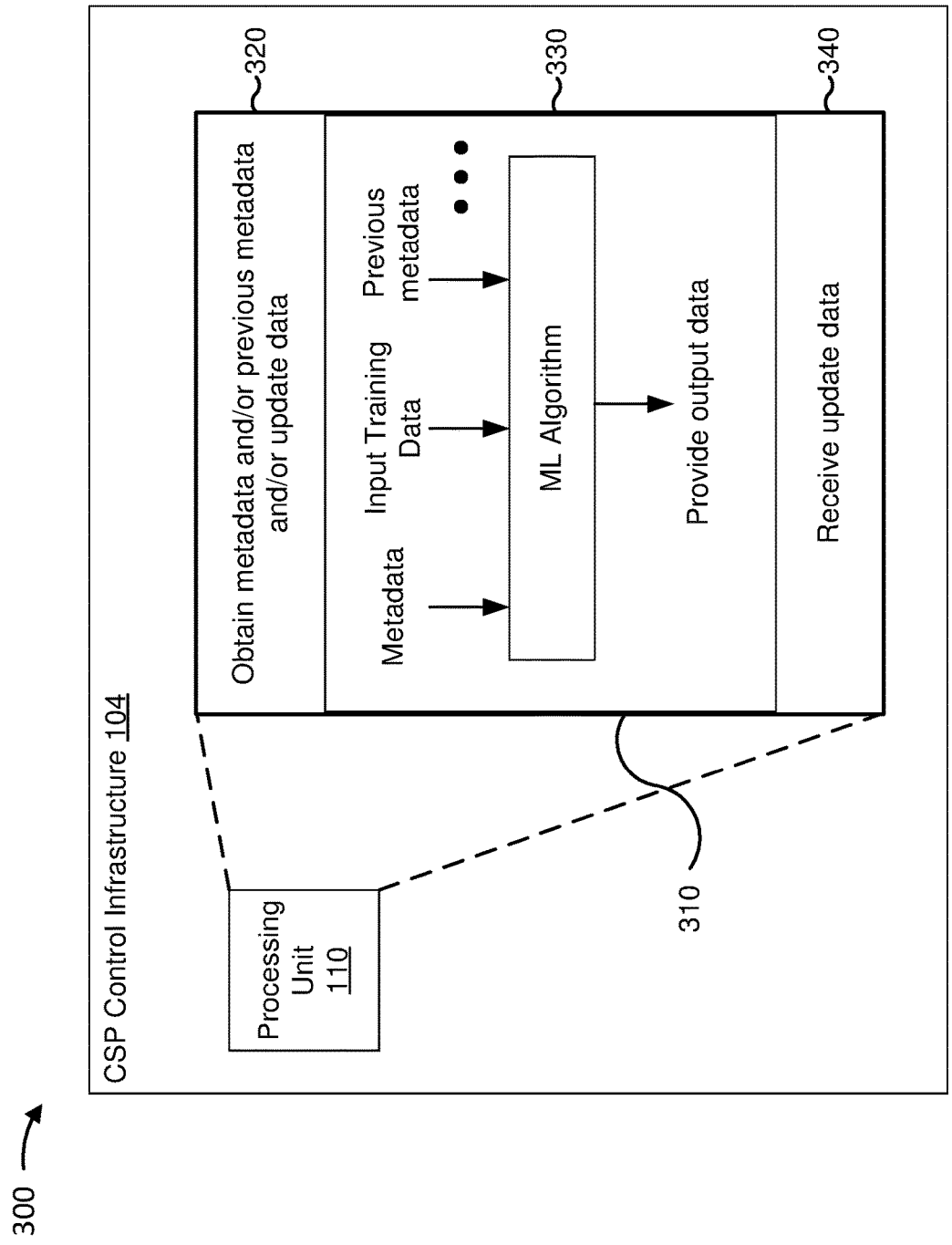

FIG. 3 is an illustration of an example associated with enabling secure auto-filling of information, according to various aspects of the present disclosure.

Figure 4:
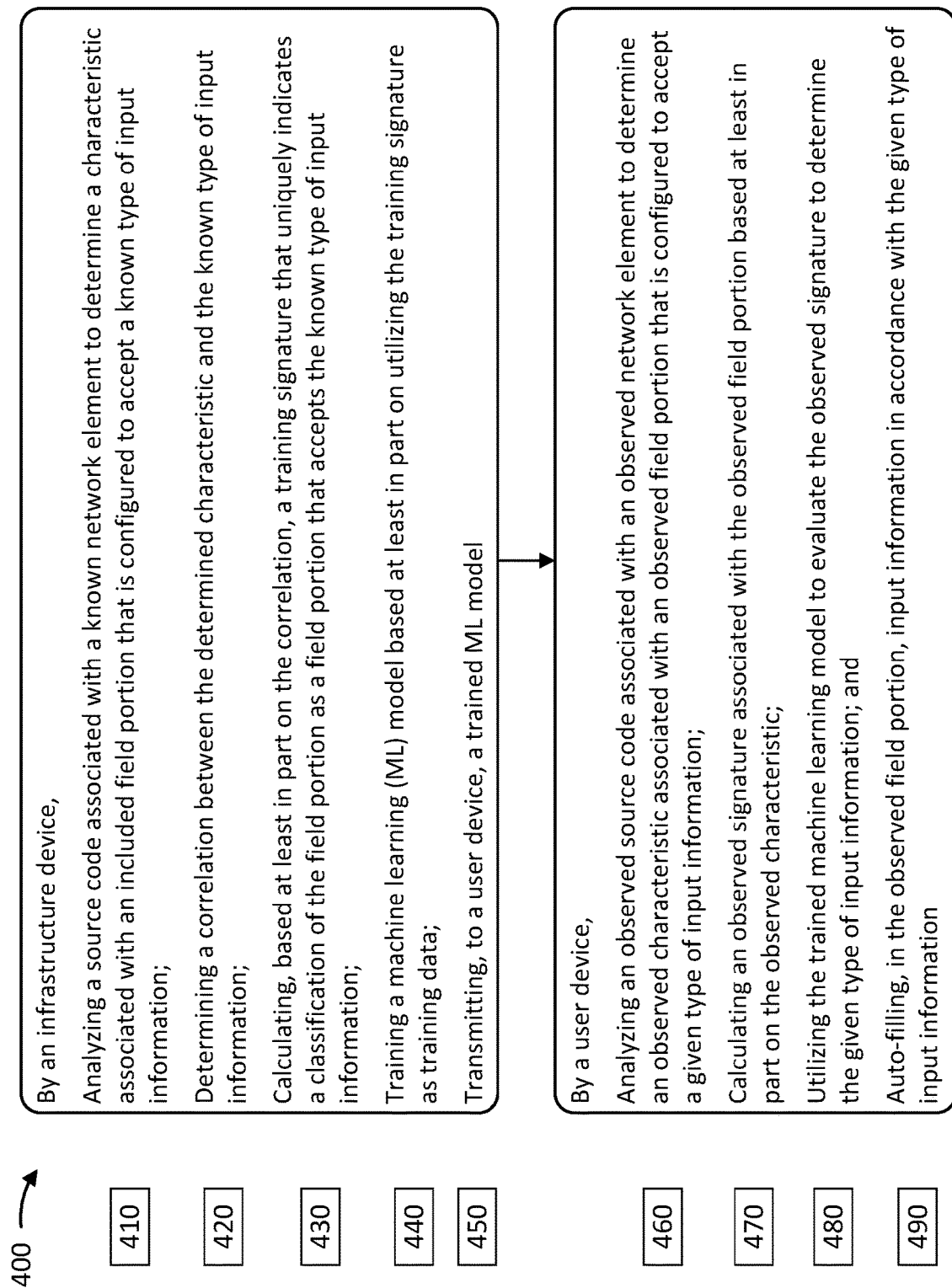

FIG. 4 is an illustration of an example process associated with enabling secure auto-filling of information, according to various aspects of the present disclosure.

Figure 5:
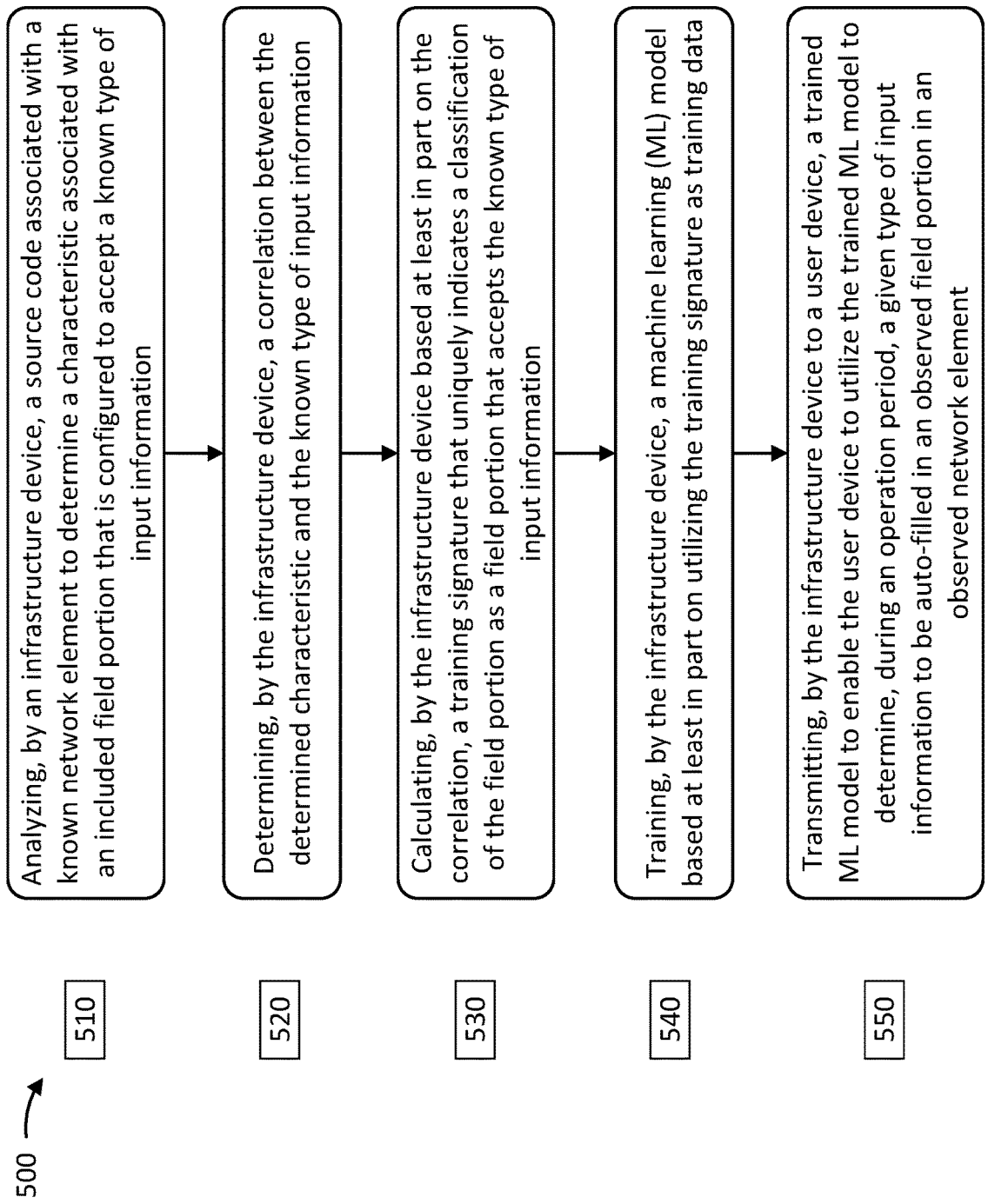

FIG. 5 is an illustration of an example process associated with enabling secure auto-filling of information, according to various aspects of the present disclosure.

Figure 6:
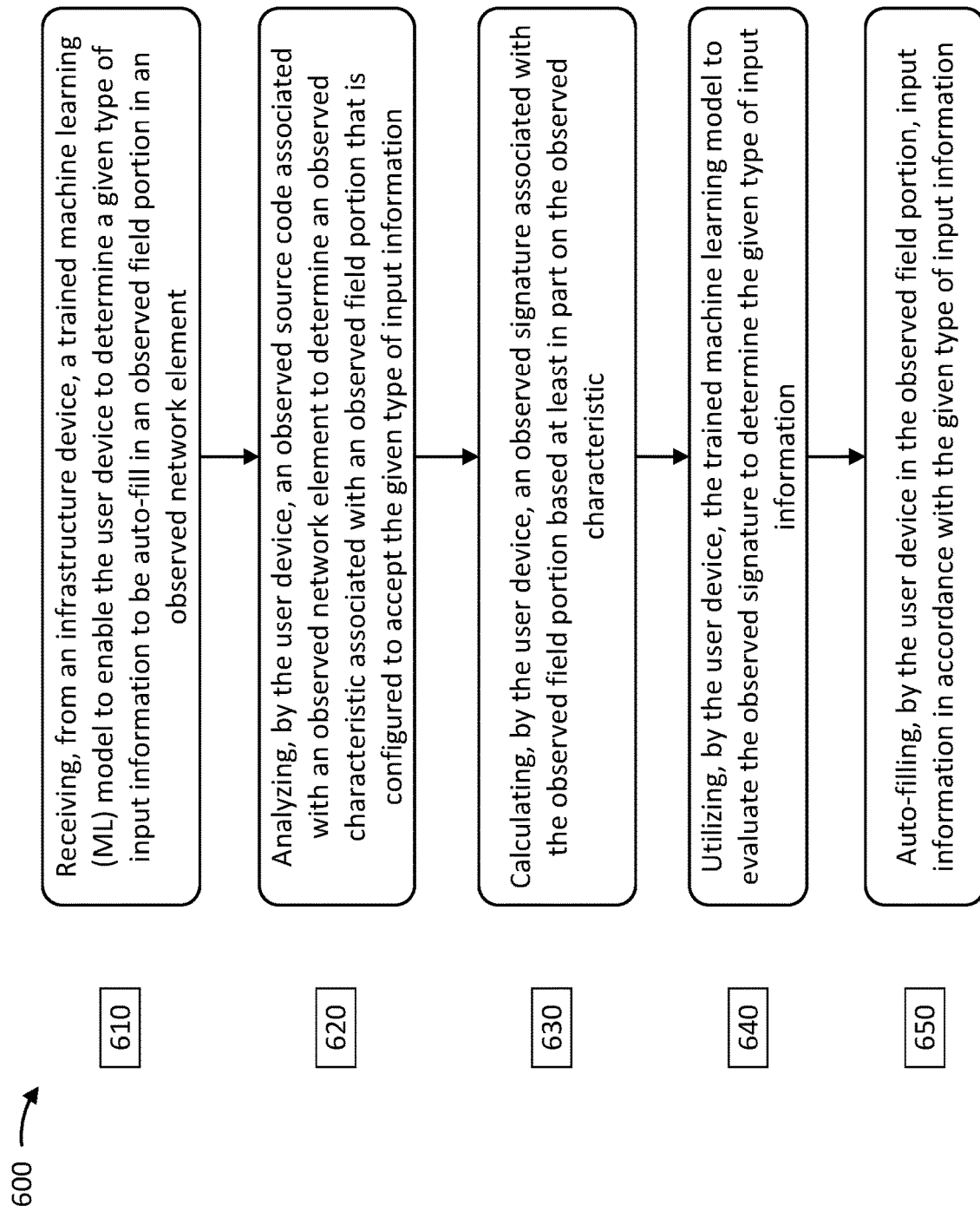

FIG. 6 is an illustration of an example process associated with enabling secure auto-filling of information, according to various aspects of the present disclosure.

Figure 7:
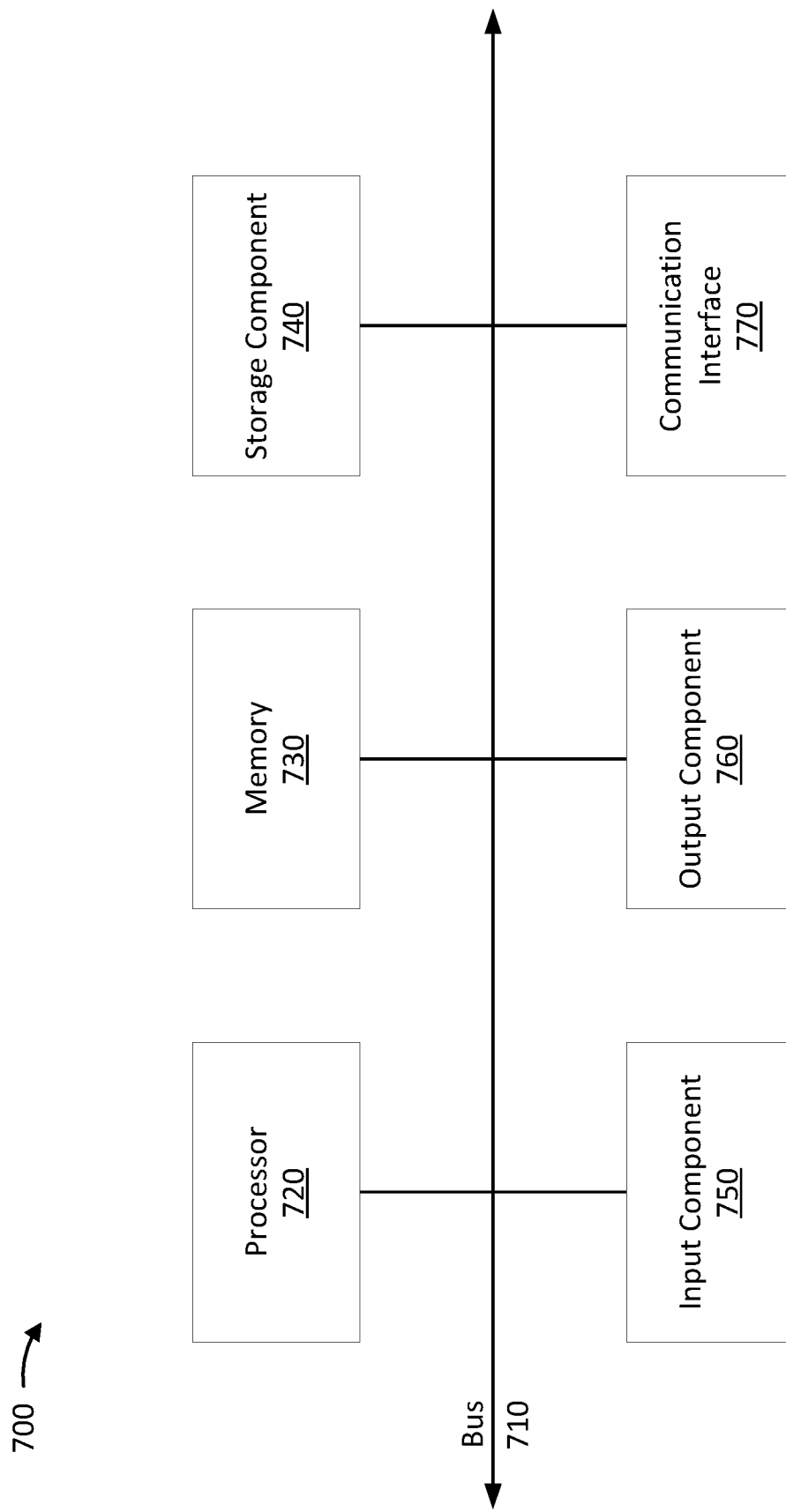

FIG. 7 is an illustration of example devices associated with enabling secure auto-filling of information, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example 100 associated with enabling secure auto-filling of information, according to various aspects of the present disclosure. Example 100 shows an architectural depiction of included components. In some aspects, the components may include one or more user devices 102 capable of communicating with a cyber security service provider (CSP) control infrastructure 104 for purposes of obtaining cyber security services. In some aspects, the one or more user devices 102 may communicate with the CSP control infrastructure 104 over a network 120. The CSP control infrastructure 104 may be owned and operated by a cyber security service provider and may include an application programming interface (API) 106, a user database 108, processing unit 110, and a security database 112. In some aspects, a user device 102 may include a security application 114, a processing unit 116, and an extension application 118. The security application 114 and/or the extension application 118 may include an application utilized by the user device 102 to communicate information and/or messages over the network 120. The security application 114 and/or the extension 118 application may be configured and provided by the CSP control infrastructure 104 to allow the user device 102 to enable secure auto-filling of information. The security application 114 and/or the extension application 118 may be configured to communicate securely (e.g., in encrypted form) with each other utilizing one or more predetermined cryptographic keys. The extension application may be installed in connection with third-party applications such as, for example, a web browser application, an email application, a social network application, a messaging application, or the like. The API 106 may be capable of communicating with the user database 108 and with the processing unit 110. Additionally, the processing unit 110 may be capable of communicating with the security database 112, which may be capable of storing data associated with providing cyber security services.

The user device 102 may be a physical computing device capable of hosting the security application 114 and/or extension application 118 and of connecting to the network 120. The user device 102 may be, for example, a laptop, a mobile phone, a tablet computer, a desktop computer, a smart device, a router, or the like. In some aspects, the user device 102 may include, for example, Internet-of-Things (IoT) devices such as smart home appliances, smart home security systems, autonomous vehicles, smart health monitors, smart factory equipment, wireless inventory trackers, biometric cyber security scanners, or the like. The network 120 may be any digital telecommunication network that permits several nodes to share and access resources. In some aspects, the network 120 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The CSP control infrastructure 104 may include a combination of hardware and software components that enable provision of cyber security services to the user device 102. The CSP control infrastructure 104 may interface with (the security application on) the user device 102 via the API 106, which may include one or more endpoints to a defined request-response message system. In some aspects, the API 106 may be configured to receive, via the network 120, a connection request from the user device 102 to establish a connection with the CSP control infrastructure 104 for purposes of obtaining the cyber security services. The connection request may include an authentication request to authenticate the user device 102. The API 106 may receive the authentication request and a request for the cyber security services in a single connection request. In some aspects, the API 106 may receive the authentication request and the request for the cyber security services in separate connection requests.

The API 106 may further be configured to handle the connection request(s) by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The cyber security service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the cyber security service provider may provide the security services to the user device 102. When the received credentials fail to match at least one of the valid credentials, the user database 108 and the processor may fail to authenticate the user device 102. In this case, the cyber security service provider may decline to provide cyber security services to the user device 102.

When the user device 102 is authenticated, the user device 102 may initiate a connection with the CSP control infrastructure 104 for obtaining the cyber security services. The processing unit 110 included in the CSP control infrastructure 104 may be configured to determine the cyber security services to be provided to the user device 102. In some aspects, the processing unit 110 may be a logical unit including a logical component configured to perform complex operations associated with computing, for example, numerical weights related to various factors associated with providing the cyber security services. The processing unit 110 may utilize the API 106 to transmit information associated with the cyber security services to the user device 102.

One or more components (e.g., API 106, user database 108, processing unit 110, and/or security database 112, security application 114, processing unit 116, and/or extension application 118) included in the CSP control infrastructure 104 and/or included in the user device 102, as shown in FIG. 1, may further be associated with a controller/processor, a memory, a communication interface, or a combination thereof (e.g., FIG. 7). For instance, the one or more components may include or may be included in a controller/processor, a memory, or a combination thereof. In some aspects, the one or more components may be separate and distinct from each other. Alternatively, in some aspects, the one or more components may be combined with another one of the one or more components. In some aspects, the one or more components may be local with respect to each other. Alternatively, in some aspects, the one or more components may be located remotely with respect to another one of the one or more components. Additionally, or alternatively, the one or more components may be implemented at least in part as software stored in a memory for execution by a processor. For example, a component (or a portion of a component) may be implemented as instructions or code stored in a non-transitory computer-readable medium and executable by a controller or a processor to perform the functions or operations of the component. Additionally, the one or more components may be configured to perform one or more functions described as being performed by another one of the one or more components.

As indicated above, FIG. 1 is provided as an example. Other examples may differ from what is described with regard to FIG. 1.

A user device may rely on network services provided by network service providers to communicate (e.g., transmit and/or receive) information and/or messages with other devices connected to the network. To gain access to these network services, the user device may register an account with the network service provider and may set up an authentication system to access the account. The authentication system may include a single-factor authentication system or a multi-factor authentication system.

In the single-factor authentication system, the user device may communicate a first factor such as, for example, a username and/or a password for authentication by the network service provider. Upon successful authentication of the first factor, the network service provider may provide the user device with the network services. In multi-factor authentication, upon successful authentication of the first factor, the user device may determine and communicate a second factor (e.g., pin, token, alphanumeric string, or a combination thereof) for further authentication by the network service provider. The second factor may be different and/or independent from the first factor. Based at least in part on successful authentication of the second factor, the network service provider may provide the user device with access to the network services.

When the user device receives different multiple network services from different multiple network service providers, the user device may set up different multiple registered accounts with the different multiple network service providers. The different multiple registered accounts may be associated with different multiple authentication systems, which may involve different multiple authentication factors (e.g., unique first factors and/or unique second factors). In this case, the user device may keep track of the different multiple authentication factors to gain access to the different multiple network services.

Additionally, the user device may register registration information (e.g., a location of the user device, financial information (e.g., payment information, etc.), identity and/or contact information (e.g., name, email address, phone number, mailing address, etc.) associated with an authorized user) that may be provided in connection with receiving the network services. In some cases, different registration information may be provided in connection with receiving the network services from the different multiple network service providers.

Keeping track of the different multiple authentication factors and/or the different registration information (e.g., collectively, "input information") may be onerous and may inefficiently utilize user device resources (e.g., processing resources, memory resources, power consumption resources, battery life, or the like). To avoid keeping track of the input information, the user device may utilize a password manager to store the input information. In some cases, the password manager may enable the user device to auto-fill the input information.

Such auto-filling of the input information by the password manager may be inaccurate. In some cases, the password manager may inaccurately auto-fill input information associated with one network service provider while providing input information associated with another network service provider. Further, the password manager may be incapable of determining a type of input information that is to be auto-fill. In an example, a network service provider may request contact information associated with the user device, but the password manager may inaccurately auto-fill payment information (e.g., phone number). In another example, the network service provider may request identification information associated with the authorized user, but the password manager may inaccurately auto-fill contact information (e.g., mailing address). In such cases, the user device may inefficiently expend user device resources (e.g., processing power, memory consumption, battery life, or the like) to correct the inaccurately auto-filled input information.

Various aspects of systems and techniques discussed in the present disclosure enable secure auto-filling of information. In some aspects, a CSP control infrastructure may enable the user device to securely and accurately auto-fill input information. To this end, the CSP control infrastructure may enable the user device to determine a type of input information that is requested. Based at least in part on determining the type of requested input information, the user device may securely and accurately auto-fill the requested type of input information.

In some aspects, during a reference period, the CSP control infrastructure may analyze source code (e.g., Hyper Text Markup Language (HTML) code) associated with known network elements (e.g., a web page, a web application, etc.) on the open Internet. Such known network elements may include network elements managed and operated by the network service providers that publish network elements on the Internet. The CSP control infrastructure may analyze a given source code to identify a form area within the given source code that includes one or more field portions configured to accept input information. The form area and the one or more field portions may indicate a requested type of input information. Further, for each known network element, the type of input information requested by the one or more field portions may be known. The CSP control infrastructure may identify and/or extract (from the source code) characteristics associated with the form area and the one or more field portions. Further, based at least in part on a knowledge of the type of information requested by the one or more field portions, the CSP control infrastructure may determine a set of rules to transform the characteristics into one or more training signatures. In some aspects, a training signature may include unique alphanumeric information and/or symbolic information and may accurately classify form areas and/or field portions based at least in part on the type of input information requested. The CSP control infrastructure may provide the determined one or more training signatures as training data to train a machine learning (ML) model to more accurately predict the type of information requested by one or more field portions.

The trained ML model may be provided via an extension application installed on the user device. In some aspects, the CSP control infrastructure may configure and provide the extension application to the user device. During an operation period, the user device may access and/or observe a network element on the Internet. In this case, the user device may observe a form area including one or more observed field portions configured to accept input information. The extension application may analyze an observed source code associated with the network element. Further, in a similar and/or analogous manner as discussed above with respect to the CSP control infrastructure, the extension application may identify and/or extract observed characteristics associated with the observed form area and/or the one or more observed field portions and may transform the observed characteristics into one or more observed signatures. The extension application may provide the observed signatures as evaluation data to the trained ML model, which may output a prediction indicating a type of input information requested by the one or more observed field portions.

The extension application may transmit information indicating the requested type of input information to a client application installed on the user device. In some aspects, the client application may be configured and provided to the user device by the CSP control infrastructure, and may have access to the input information. The extension application and the client application may be configured to communicate securely (e.g., in encrypted form) with each other. Based at least in part on the information indicating the requested type of input information, the client application may retrieve and securely transmit the input information to the extension application to enable the extension application to auto-fill that requested type of input information in the one or more observed field portions.

In this way, by providing a trained ML model to the user device, the CSP control infrastructure may enable the user device to, in real time, more accurately determine and auto-fill the type of input information that is requested by one or more observed field portions in an observed network element. In an example, utilizing a security application to manage input information and an extension application to auto-fill the input information may reduce a risk of sensitive information becoming compromised. As a result, the CSP control infrastructure and/or the user device may enable efficient utilization of resources (e.g., processing power, memory consumption, battery life, or the like).

Applicant recognizes that utilizing a web application and/or a web browser to store and auto-fill input information may lead to the input information being collected by, for example, a publisher of the web application and/or web browser and/or by a malicious party, thereby compromising private information associated with the user device.

FIG. 2 is an illustration of an example flow 200 associated with enabling secure auto-filling of information, according to various aspects of the present disclosure. The example flow 200 may include a user device in communication with a CSP control infrastructure 104. In some aspects, the user device may receive cyber security services from the CSP control infrastructure 104 to allow the CSP control infrastructure to enable the user device to securely auto-fill input information. When the user device is authenticated, the user device may initiate a connection with the CSP control infrastructure 104 to obtain the cyber security services. The user device may be similar to a user device 102 discussed above with respect to FIG. 1. In some aspects, the user device may be associated with an account registered with the CSP control infrastructure 104. The user device may install a security application (e.g., security application 114) and/or an extension application (e.g., extension application 118) associated with the CSP control infrastructure 104. The user device may utilize the security application and/or the extension application to communicate with an application programming interface (API) and/or a processor (e.g., processing unit 110, processor 720) associated with the CSP control infrastructure 104. In some aspects, the user device and the CSP control infrastructure 104 may communicate with each other over a network (e.g., network 120). As discussed elsewhere herein, the CSP control infrastructure 104 may enable the user device to enable secure auto-filling of information.

In some aspects, the user device may install the extension application in connection with one or more communication applications such as, for example, email clients (e.g., Outlook application, Gmail application, etc.), web browsers (e.g., Firefox, Chrome, Internet Explorer, etc.), messaging clients (e.g., Slack, Facebook messenger, etc.), social media applications (e.g., Facebook, Instagram, etc.), or the like. Such installation may allow the extension application access to information rendered by and/or requested by the one or more communication applications.

In some aspects, the security application and/or the extension application may enable the user device to communicate information and/or messages with other devices over the network. Based at least in part on the security application and/or the extension application being installed, the security application and/or the extension application may enable the user device to receive information to be processed by the security application and/or the extension application and/or by the CSP control infrastructure 104. The security application and/or the extension application may include respective graphical user interfaces to receive the information via local input interfaces (e.g., touch screen, keyboard, mouse, pointer, etc.) associated with the user devices. The information may be received via text input or via a selection from among a plurality of options (e.g., pull down menu, etc.). Further, the security application and/or the extension application may enable transmission of at least a portion of the information to the CSP control infrastructure 104. In some aspects, the security application and/or the extension application may activate and/or enable, at appropriate times, the graphical interface for receiving the information. For instance, the security application and/or the extension application may cause a screen (e.g., local screen) associated with the user device to display, for example, a pop-up message to request entry of the information. In some cases, the security application and/or the extension application may cause the screen associated with the user device to display, for example, a visual pop-up message to issue a notification. Further, the security application and/or the extension application may cause audio devices (e.g., speakers, headphones, etc.) associated with the user device to produce an audible message to issue the notification. In some aspects, the notification may include audible and/or visual messages. In some aspects, the security application and/or the extension application may utilize a processing unit (e.g., processing unit 116, processor 720) associated with the user device to perform such processes/operations associated with enabling secure auto-filling of information.

As shown by reference numeral 210, during a reference period, the CSP control infrastructure 104 may analyze known network elements to determine signatures indicating classification of form areas and/or field portions. In an example, the CSP control infrastructure 104 may analyze one or more known network elements (e.g., webpages, websites, messaging clients, social media applications, etc.) that include form areas having one or more field portions configured to accept input information. The one or more field portions may be structured and or configured to accept the input information in the form of, for example, text, numerical digits, special characters (e.g., checkmark, etc.), radio buttons, dates, selection from options in a drop-down menu, a file, a document, an image, audio content, and/or video content.

In some aspects, the known network elements may include all webpages, web applications, etc. publicly available via the World Wide Web, especially those webpages, applications, etc. that may include form areas and/or field portions configured to accept input information. The known network elements may be associated with, for example, financial institutions, business entities, medical institutions, educational institutions, etc. that may include form areas and/or field portions configured to accept input information. The web applications may be associated with, for example, messaging clients, social media applications, etc. that may include form areas and/or field portions configured to accept input information.

For each known network element, the CSP control infrastructure 104 may access and analyze a source code (e.g., HTML code) associated with the known network element. Based at least in part on analysis of the source code, the CSP control infrastructure 104 may determine a boundary associated with a form area rendered or to be rendered by the network element on, for example, a screen associated with a user device. In some aspects, the form area may include, within its boundary, one or more field portions configured to accept input information. Based at least in part on determining the boundary associated with the form area, the CSP control infrastructure 104 may determine the one or more field portions included within the form area.

Based at least in part on determining the one or more field portions, the CSP control infrastructure 104 may classify the form areas and/or one or more field portions based at least in part on the type of input information requested. In some aspects, for each known network element, the type of input information requested by the one or more field portions may be known. For instance, the CSP control infrastructure 104 may know that a first field portion is requesting a username and/or password information, that a second field portion is requesting financial information, that a third field portion is requesting identity information, that a fourth field portion is requesting contact information, and so on.

Based at least in part on knowledge of the type of input information requested, the CSP control infrastructure 104 may determine characteristics associated with the form area and/or the one or more field portions. These characteristics may include form characteristics and/or field characteristics associated with the form area and/or the one or more field portions. In some aspects, to determine the characteristics, the CSP control infrastructure 104 may utilize the information determined and/or extracted from the source codes such as, for example, an amount of field portions in a form area, kind of field portions (e.g., requesting entry of information, selection of information, etc.) in a form area, labels associated with a form area and/or field portions, keywords associated with a form area and/or field portions, etc.

Further, the CSP control infrastructure 104 may determine one or more correlations by correlating the determined characteristics with the known type of input information requested. In some aspects, based at least in part on such characteristics, the CSP control infrastructure 104 may classify form areas and/or field portions with respect to the type of input information requested.

For instance, based at least in part on a structure of the one or more field portions included within the boundary of the form area, the CSP control infrastructure 104 may determine form characteristics that assist with classifying the form area. In an example, the CSP control infrastructure 104 may determine a first form characteristic to classify a form area as a simple form in which the included one or more field portions are structured to accept, for example, text, numerical digits, special characters (e.g., checkmark, etc.), radio buttons inputs, dates, or the like. In another example, the CSP control infrastructure 104 may determine a second form characteristic to classify a form area as a list form in which the included one or more field portions are structured to accept, for example, selection of an option from a list of options, selection of a checkbox from a list of checkboxes, selection of an option from a drop-down menu, or the like.

In yet another example, the CSP control infrastructure 104 may determine a third form characteristic to classify a form area as a complex form in which the included one or more field portions are structured to accept, for example, a file, a document, an image, audio content, video content, or the like. In some aspects, the CSP control infrastructure 104 may determine a fourth form characteristic to classify a form area as a hybrid form when the included one or more field portions are structured as two or more of a field portion in a simple form, a field portion in a list form, or a field portion in a complex form.

In some aspects, the CSP control infrastructure 104 may determine field characteristics that assist with classifying the one or more field portions based at least in part on a structure of the one or more field portions. In some aspects, the CSP control infrastructure 104 may determine field characteristics that assist with classifying the one or more field portions based at least in part on the information (e.g., labels, keywords, etc.) determined and/or extracted from the source code. In some instances, the one or more field portions may not be associated with labels and/or keywords in the source code.

In an example, the CSP control infrastructure 104 may determine that a first field portion is structured to accept a combination of letterings including, for example, text, numerical digits, special characters (e.g., !, @, #, $, %, ^, &, *, (,), etc.) and/or is labeled utilizing words such as, for example, username and/or password. In this case, the CSP control infrastructure 104 may determine a first field characteristic to classify the first field portion as a field portion configured to accept authentication information such as, for example, a username and/or password. In another example, the CSP control infrastructure 104 may determine that a second field portion is structured to accept, for example, alphanumeric information including information that identifies a geographical location such as, for example, a city, a state, a country, a zip code, or the like and/or is labeled utilizing words such as, for example, address. In this case, the CSP control infrastructure 104 may determine a second field characteristic to classify the second field portion as a field portion configured to accept geographical information such as, for example, a mailing address.

In yet another example, the CSP control infrastructure 104 may determine that a third field portion is structured to accept, for example, alphanumeric information including a combination of specific special characters (e.g., "@" and ".") and/or is labeled utilizing words such as, for example, email and/or address. In this case, the CSP control infrastructure 104 may determine a third field characteristic to classify the third field portion as a field portion configured to accept contact information such as, for example, an email address. In yet another example, the CSP control infrastructure 104 may determine that a fourth field portion is structured to accept, for example, a specific amount (e.g., 10) numeric characters and/or is labeled utilizing words such as, for example, phone and/or contact. In this case, the CSP control infrastructure 104 may determine a fourth field characteristic to classify the fourth field portion as a field portion configured to accept contact information such as, for example, a phone number. In some aspects, the fourth field portion may be structured to accept, for example, a specific amount (e.g., 16) numeric characters and/or is labeled utilizing words such as, for example, payment and/or credit. In this case, the CSP control infrastructure 104 may determine the fourth field characteristic to classify the fourth field portion as a field portion configured to accept payment information such as, for example, a credit card number and associated information. In yet another example, the CSP control infrastructure 104 may determine that a fifth field portion is structured to accept, for example, numeric digits separated by specific special characters (e.g., "/") and/or is labeled utilizing words such as, for example, date. In this case, the CSP control infrastructure 104 may determine a fifth field characteristic to classify the fifth field portion as a field portion configured to accept date information such as, for example, a date of birth.

In yet another example, the CSP control infrastructure 104 may determine that a sixth field portion is structured to accept, for example, selection of an option from a list of options, selection of a checkbox from a list of checkboxes, selection of an option from a drop-down menu, or the like. In this case, the CSP control infrastructure 104 may determine a sixth field characteristic to classify the sixth field portion as a list field portion, which is not likely to accept authentication information, geographical information, contact information, payment information, date information, or the like. In yet another example, the CSP control infrastructure 104 may determine that a seventh field is structured to accept uploaded information including, for example, a file, a document, an image, audio content, video content, or the like. In this case, the CSP control infrastructure 104 may determine a seventh field characteristic to classify the seventh field portion as a field portion configured to accept upload information, which is not likely to accept authentication information, geographical information, contact information, payment information, date information, or the like. In some aspects, the CSP control infrastructure 104 may determine an eighth field characteristic to classify a given field portion as a hybrid field portion when the given field portion is structured as a field portion configured to accept multiple types of input information discussed above.

Based at least in part on determining the form characteristics that enable classification of form areas and/or the field characteristics that enable classification of field portions, the CSP control infrastructure 104 may determine (e.g., calculate) signatures indicating the classification of the form areas and/or the field portions. In some aspects, the CSP control infrastructure 104 may transform the form characteristics into form signatures that uniquely represent classification of form areas. In an example, a first form signature may uniquely represent the simple form, a second form signature may uniquely represent the list form, a third form signature may uniquely represent the complex form, a fourth form signature may uniquely represent the hybrid form, and so on. Analogously, the CSP control infrastructure 104 may transform the field characteristics into field signatures that uniquely represent classification of the one or more field portions. In an example, a first field signature may uniquely represent the first field characteristic, a second field signature may uniquely represent the second field characteristic, a third field signature may uniquely represent the third field characteristic, . . . , an eighth field signature may uniquely represent the eight field characteristic, and so on. In some aspects, a signature may include numeric information, alphanumeric information, and/or symbolic information.

Based at least in part on determining the signatures, as shown by reference numeral 220, the CSP control infrastructure 104 may utilize the determined signatures as training data to train a machine learning (ML) model. For instance, as shown in FIG. 3, the processing unit 110 included in the CSP control infrastructure 104 may include and/or utilize a self-learning ML model 310 in connection with classification of form areas and/or field portions. In some aspects, the ML model 310 may include a supervised learning model. In some aspects, the ML model 310 may include a semi-supervised or an unsupervised learning model. The processing unit 110 may utilize the ML model 310 to classify, automatically and with improved accuracy, the form areas and/or field portions.

As shown by reference numeral 320, the ML model 310 may obtain metadata and/or previous metadata and/or update data. The metadata and/or previous metadata may be associated with information received during at least one previous instance of classifying form areas and/or field portions. In some aspects, the previous metadata may include historical metadata associated with the at least one previous instance of classifying form areas and/or field portions. The update data may be associated with an output provided by the ML model 310 during at least one previous instance of classifying form areas and/or field portions, and may include historical output data associated with at least one previous instance of classifying form areas and/or field portions. In some aspects, the processing unit 110 may store the above data in, and the ML model 310 may obtain the above data from, for example, one or more memories described elsewhere herein (e.g., security database 112, memory 730).

As shown by reference number 330, the ML model 310 may process training data using a machine learning algorithm (ML algorithm). The training data may include, for example, the metadata, the previous metadata, the update data, and/or input training data. Input training data may include the signatures determined by the CSP control infrastructure 104 in connection with classifying the form areas and/or field portions.

In some aspects, the ML model 310 may utilize the ML algorithm to evaluate the training data to learn trends and patterns associated with classifying the form areas and/or field portions. In an example, the ML algorithm may evaluate various characteristics and/or characteristics associated with the form areas and/or field portions that are determined based at least in part on analysis of source codes. In some aspects, the ML algorithm may evaluate and take into account feedback information (e.g., success rate) associated with previously classifying the form areas and/or field portions. The ML algorithm may provide output data to the processing unit 110 based at least in part on the evaluated training data and the learned trends and patterns. In some aspects, the output data may indicate that the form areas and/or field portions were classified successfully, thereby indicating that the ML model may successfully determine and/or more accurately identify the type of information requested by the form areas and/or the field portions. The output data may provide a value indicating a likelihood associated with an accuracy of identifying the type of information requested by the form areas and/or field portions.

As shown by reference number 340, at an end of an instance of classifying the form areas and/or field portions, the ML model 310 may receive update data including at least the training data and/or the output data. In some aspects, the update data may be included in the previous metadata stored in the one or more memories (e.g., security database 112, memory 730) to be used as training data for future iterations of classifying the form areas and/or field portions. In some aspects, the ML model 310 may evaluate the update data to learn various aspects such as accuracy, consistency, reliability, efficiency, and/or the like of the output data in enabling the processing unit 110 to more accurately identify the type of information requested by the form areas and/or field portions. In this way, the processing unit 110 may utilize the ML model 310 to apply a rigorous and automated process to more accurately identify the type of information requested by the form areas and/or field portions.

Based at least in part on training the ML model, as shown by reference numeral 230, the CSP control infrastructure 104 may transmit a trained ML model to the user device. In some aspects, the trained ML model may be included within the security application and/or the extension application provided by the CSP control infrastructure 104 to the user device. Further, the CSP control infrastructure 104 may configure the security application and/or the extension application to, in a similar and/or analogous manner as discussed above with the CSP control infrastructure 104, analyze source code, determine (e.g., identify) form areas and/or field portions, determine form characteristics and/or field characteristics, and/or determine signatures associated the form areas and/or field portions.

During an operation period, the user device may utilize a communication application to access and/or observe a network element. The observed network element may include (one or more) observed form areas with (one or more) observed field portions within boundaries of the observed form areas. Based at least in part on the security application and/or the extension application being installed in connection with the communication application, the security application and/or the extension application may access an observed source code associated with the observed network element.

As shown by reference numeral 240, the security application and/or the extension application may analyze the observed source code associated with the observed network element. Based at least in part on analysis of the observed source code, the security application and/or the extension application may determine a boundary associated with the observed form area rendered or to be rendered by the network element on, for example, a screen associated with the user device. In some aspects, the observed form area may include, within its boundary, the observed field portions configured to accept input information. Based at least in part on determining the boundary associated with the observed form area, the security application and/or the extension application may determine the observed field portions included within the observed form area.

Based at least in part on determining the observed form area and observed field portions, the security application and/or the extension application may determine observed characteristics. These observed characteristics may include observed form characteristics and/or observed field characteristics that respectively indicate characteristics associated with the observed form area and/or observed field portions. In some aspects, to determine the observed characteristics, the security application and/or the extension application may utilize determined and/or extracted information such as, for example, an amount of observed field portions in the observed form area, kind of observed field portions (e.g., requesting entry of information, selection of information, etc.) in the observed form area, labels associated with the observed form area and/or observed field portions, keywords associated with the observed form area and/or observed field portions, etc.

For instance, based at least in part on a structure of the observed field portions included within the boundary of the observed form area, the security application and/or the extension application may determine the observed form characteristics that assist with identifying the type of input information requested. In an example, the security application and/or the extension application may determine a first observed form characteristic based at least in part on determining that the observed field portions are structured to accept, for example, text, numerical digits, special characters (e.g., checkmark, etc.), radio buttons inputs, dates, or the like. In another example, the security application and/or the extension application may determine a second observed form characteristic based at least in part on determining that the observed field portions are structured to accept, for example, selection of an option from a list of options, selection of a checkbox from a list of checkboxes, selection of an option from a drop-down menu, or the like. In yet another example, the security application and/or the extension application may determine a third observed form characteristic based at least in part on determining that the observed field portions are structured to accept, for example, a file, a document, an image, audio content, video content, or the like. In some aspects, the security application and/or the extension application may determine a fourth observed form characteristic based at least in part on determining that the observed field portions are structured as two or more of an observed field portion in a simple form, an observed field portion in a list form, or an observed field portion in a complex form.

In some aspects, the security application and/or the extension application may determine observed field characteristics to assist with identifying the type of input information requested based at least in part on a structure of the observed field portions. In some aspects, the security application and/or the extension application may determine the observed field characteristics based at least in part on the information (e.g., labels, keywords, etc.) determined and/or extracted from the observed source code. In some instances, the one or more field portions may not be associated with labels and/or keywords.

In an example, the security application and/or the extension application may determine an observed first field characteristic based at least in part on determining that an observed first field portion is structured to accept a combination of letterings including, for example, text, numerical digits, special characters (e.g., !, @, #, $, %, ^, &, *, (,), etc.) and/or is labeled utilizing words such as, for example, username and/or password. In another example, the security application and/or the extension application may determine an observed second field characteristic based at least in part on determining that an observed second field portion is structured to accept, for example, alphanumeric information including information that identifies a geographical location such as, for example, a city, a state, a country, a zip code, or the like and/or is labeled utilizing words such as, for example, address.

In yet another example, the security application and/or the extension application may determine an observed third field characteristic based at least in part on determining that an observed third field portion is structured to accept, for example, alphanumeric information including a combination of specific special characters (e.g., "@" and ".") and/or is labeled utilizing words such as, for example, email and/or address. In yet another example, the security application and/or the extension application may determine an observed fourth field characteristic based at least in part on determining that an observed fourth field portion is structured to accept, for example, a specific amount (e.g., ten) numeric characters and/or is labeled utilizing words such as, for example, phone and/or contact. In some aspects, the security application and/or the extension application may determine the fourth field characteristic when the fourth field portion is structured to accept, for example, a specific amount (e.g., sixteen) numeric characters and/or is labeled utilizing words such as, for example, payment and/or credit. In yet another example, the security application and/or the extension application may determine an observed fifth field characteristic based at least in part on determining that an observed fifth field portion is structured to accept, for example, numeric digits separated by specific special characters (e.g., "/") and/or is labeled utilizing words such as, for example, date.

In yet another example, the security application and/or the extension application may determine an observed sixth field characteristic based at least in part on determining that an observed sixth field portion is structured to accept, for example, selection of an option from a list of options, selection of a checkbox from a list of checkboxes, selection of an option from a drop-down menu, or the like. In yet another example, the security application and/or the extension application may determine an observed seventh field characteristic based at least in part on determining that an observed seventh field is structured to accept, for example, a file, a document, an image, audio content, video content, or the like. In some aspects, the security application and/or the extension application may determine an observed eighth field characteristic to assist with identifying a hybrid field portion when the given field portion is structured as a field portion configured to accept multiple types of input information.

Based at least in part on determining the observed form characteristics and/or observed field characteristics that enable identification of the type of input information requested, the security application and/or the extension application may determine (e.g., calculate) observed signatures associated with the observed form areas and/or observed field portions. In some aspects, the security application and/or the extension application may transform the observed form characteristics into observed form signatures that uniquely represent the observed form areas. In an example, a first observed form signature may uniquely represent a simple form, a second observed form signature may uniquely represent a list form, a third observed form signature may uniquely represent a complex form, and/or a fourth observed form signature may uniquely represent a hybrid form. Analogously, the security application and/or the extension application may transform the observed field characteristics into observed field signatures that uniquely represent the observed field portions. In an example, a first observed field signature may uniquely represent the observed first field portion, a second observed field signature may uniquely represent the observed second field portion, a third observed field signature may uniquely represent the observed third field portion, . . . , an eighth observed field signature may uniquely represent the observed eighth field portion, and so on. In some aspects, an observed signature may include numeric information, alphanumeric information, and/or symbolic information.

Based at least in part on determining the observed signatures, as shown by reference numeral 250, the user device may utilize the trained ML model to determine and/or auto-fill the type of information requested. In an example, the security application and/or the extension application may input the observed signatures as evaluation data to the trained ML model. Based at least in part on evaluating the observed signatures, the trained ML model may provide an output that indicates, for each observed form area and/or field portion, the type of input information that is requested.

Based at least in part on the indicated type of input information, the extension application may transmit a request message to the security application requesting the security application to provide the indicated type of input information. In some aspects, the request message may be encrypted utilizing a predetermined cryptographic key to enable secure communication between the extension application and the secure application. In some aspects, the request message may include identification information associated with the network element and/or the network service provider associated with the network element to enable the security application to retrieve and provide input information associated with the network element.

Based at least in part on receiving the encrypted request message, the security application may utilize the predetermined cryptographic key to decrypt the encrypted request message. In an example, the security application may have previously stored different input information in association with different network elements and/or different network service providers. In this case, the security application may utilize the identification information from the request message to determine the input information that is to be retrieved and provided to the extension application.

For instance, the security application may retrieve and provide the input information that is stored in association with the network element and/or network service provider that is identified by (e.g., matches) the identification information. In some aspects, the security application may store the input information in a local memory (e.g., memory 730) and/or a remote memory (e.g., cloud server) associated with the user device. In some aspects, the different multiple authentication factors and/or the different registration information may be stored in association with the different network service providers to enable the security application to provide appropriate authentication factors and/or registration information when requested by the extension application.

Based at least in part on retrieving the input information, the security application may transmit the input information to the extension application, and the extension application may auto-fill the received input information in the observed field portions.

In this way, by providing a trained ML model to the user device, the CSP control infrastructure may enable the user device to, in real time, more accurately determine and auto-fill the type of input information that is requested by one or more observed field portions in an observed network element. As a result, the CSP control infrastructure and/or the user device may enable efficient utilization of resources (e.g., processing power, memory consumption, battery life, or the like).

As indicated above, FIGS. 2 and 3 are provided as examples. Other examples may differ from what is described with regard to FIGS. 2 and 3.

FIG. 4 is an illustration of an example process 400 associated with enabling secure auto-filling of information, according to various aspects of the present disclosure. In some aspects, the process 400 may be performed by a memory and/or a processor/controller (e.g., processing unit 116, processor 720) associated with a user device/endpoint (e.g., user device 102) running a security application and/or an extension application, and/or by a memory and/or a processor (e.g., processing unit 110, processor 720) associated with an infrastructure device associated with a control infrastructure (e.g., CSP control infrastructure 104). As shown by reference numeral 410, process 400 may include analyzing, by an infrastructure device, a source code associated with a known network element to determine a characteristic associated with an included field portion that is configured to accept a known type of input information. For instance, the infrastructure device may utilize the associated memory and/or processor to analyze a source code associated with a known network element to determine a characteristic associated with an included field portion that is configured to accept a known type of input information, as discussed elsewhere herein.

As shown by reference numeral 420, process 400 may include determining, by the infrastructure device, a correlation between the determined characteristic and the known type of input information. For instance, the user device may utilize the associated memory and/or processor to determine a correlation between the determined characteristic and the known type of input information, as discussed elsewhere herein.

As shown by reference numeral 430, process 400 may include calculating, by the infrastructure device based at least in part on the correlation, a training signature that uniquely indicates a classification of the field portion as a field portion that accepts the known type of input information. For instance, the user device may utilize the associated memory and/or processor to calculate, based at least in part on the correlation, a training signature that uniquely indicates a classification of the field portion as a field portion that accepts the known type of input information, as discussed elsewhere herein.

As shown by reference numeral 440, process 400 may include training, by the infrastructure device, a machine learning (ML) model based at least in part on utilizing the training signature as training data. For instance, the infrastructure device may utilize the associated memory and/or processor to train a machine learning (ML) model based at least in part on utilizing the training signature as training data, as discussed elsewhere herein.

As shown by reference numeral 450, process 400 may include transmitting, by the infrastructure device to a user device, a trained ML model. For instance, the infrastructure device may utilize an associated communication interface (e.g., communication interface 770) along with the associated memory and/or processor to transmit, to the user device, a trained ML model, as discussed elsewhere herein.

As shown by reference numeral 460, process 400 may include analyzing, by the user device, an observed source code associated with an observed network element to determine an observed characteristic associated with an observed field portion that is configured to accept a given type of input information. For instance, the user device may utilize the associated memory and/or processor to analyze an observed source code associated with an observed network element to determine an observed characteristic associated with an observed field portion that is configured to accept a given type of input information, as discussed elsewhere herein.

As shown by reference numeral 470, process 400 may include calculating, by the user device, an observed signature associated with the observed field portion based at least in part on the observed characteristic. For instance, the user device may utilize the associated memory and/or processor to calculate an observed signature associated with the observed field portion based at least in part on the observed characteristic, as discussed elsewhere herein.

As shown by reference numeral 480, process 400 may include utilizing, by the user device, the trained machine learning model to evaluate the observed signature to determine the given type of input information. For instance, the user device may utilize the associated memory and/or processor to utilize the trained machine learning model to evaluate the observed signature to determine the given type of input information, as discussed elsewhere herein.

As shown by reference numeral 490, process 400 may include auto-filling, by the user device in the observed field portion, input information in accordance with the given type of input information. For instance, the user device may utilize the associated memory and/or processor to auto-fill, in the observed field portion, input information in accordance with the given type of input information, as discussed elsewhere herein.

Process 400 may include additional aspects, such as any single aspect or any combination of aspects described below and/or in connection with one or more other processes described elsewhere herein.

In a first aspect, in process 400, analyzing the source code to determine the characteristic includes the infrastructure device analyzing a label associated with the field portion in the source code to determine the characteristic.

In a second aspect, alone or in combination with the first aspect, in process 400, analyzing the source code to determine the characteristic includes the infrastructure device analyzing a structure of the field portion in the source code to determine the characteristic, the structure indicating that the field portion is configured to accept the known type of input information as a combination of alphanumerical characters and special characters.

In a third aspect, alone or in combination with the first through second aspects, in process 400, analyzing the source code to determine the characteristic includes the infrastructure device analyzing a structure of the field portion in the source code to determine the characteristic, the structure indicating that the field portion is configured to accept the known type of input information as a selection of an option from a list of options.

In a fourth aspect, alone or in combination with the first through third aspects, in process 400, analyzing the source code to determine the characteristic includes the infrastructure device analyzing a structure of the field portion in the source code to determine the characteristic, the structure indicating that the field portion is configured to accept the known type of input information as upload information.

In a fifth aspect, alone or in combination with the first through fourth aspects, in process 400, the known network element includes a webpage or a web application available on the Internet.

In a sixth aspect, alone or in combination with the first through fifth aspects, in process 400, the known type of input information includes authentication information, contact information, or payment information.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with enabling secure auto-filling of information, according to various aspects of the present disclosure. In some aspects, the process 500 may be performed by a memory and/or a processor/controller (e.g., processing unit 110, processor 720) associated with an infrastructure device (e.g., CSP control infrastructure 104). As shown by reference numeral 510, process 500 may include analyzing, by an infrastructure device, a source code associated with a known network element to determine a characteristic associated with an included field portion that is configured to accept a known type of input information. For instance, the infrastructure device may utilize the associated memory and/or processor to analyze a source code associated with a known network element to determine a characteristic associated with an included field portion that is configured to accept a known type of input information, as discussed elsewhere herein.

As shown by reference numeral 520, process 500 may include determining, by the infrastructure device, a correlation between the determined characteristic and the known type of input information. For instance, the infrastructure device may utilize the associated memory and/or processor to determine a correlation between the determined characteristic and the known type of input information, as discussed elsewhere herein.

As shown by reference numeral 530, process 500 may include calculating, by the infrastructure device based at least in part on the correlation, a training signature that uniquely indicates a classification of the field portion as a field portion that accepts the known type of input information. For instance, the infrastructure device may utilize the associated memory and/or processor to calculate, based at least in part on the correlation, a training signature that uniquely indicates a classification of the field portion as a field portion that accepts the known type of input information, as discussed elsewhere herein.

As shown by reference numeral 540, process 500 may include training, by the infrastructure device, a machine learning (ML) model based at least in part on utilizing the training signature as training data. For instance, the infrastructure device may utilize the associated memory and/or processor to train a machine learning (ML) model based at least in part on utilizing the training signature as training data, as discussed elsewhere herein.

As shown by reference numeral 540, process 500 may include transmitting, by the infrastructure device to a user device, a trained ML model to enable the user device to utilize the trained ML model to determine, during an operation period, a given type of input information to be auto-filled in an observed field portion in an observed network element. For instance, the infrastructure device may utilize an associated communication interface (e.g., communication interface 770) along with the associated memory and/or processor to transmit, to a user device, a trained ML model to enable the user device to utilize the trained ML model to determine, during an operation period, a given type of input information to be auto-filled in an observed field portion in an observed network element, as discussed elsewhere herein.

Process 500 may include additional aspects, such as any single aspect or any combination of aspects described below and/or in connection with one or more other processes described elsewhere herein.

In a first aspect, process 500 may include analyzing the source code to determine a boundary of reform area including the field portion.

In a second aspect, alone or in combination with the first aspect, process 500 may include classifying a form area, that includes the field portion, as a simple form based at least in part on the field portion being structured to accept the known type of input information as a combination of alphanumerical characters and special characters.

In a third aspect, alone or in combination with the first through second aspects, process 500 may include classifying a form area, that includes the field portion, as a list form based at least in part on the field portion being structured to accept the known type of input information as a selection of an option from a list of options.

In a fourth aspect, alone or in combination with the first through third aspects, process 500 may include classifying a form area, that includes the field portion, as a complex form based at least in part on the field portion being structured to accept the known type of input information as upload information.

In a fifth aspect, alone or in combination with the first through fourth aspects, in process 500, the known network element includes a webpage or a web application available on the Internet.

In a sixth aspect, alone or in combination with the first through fifth aspects, in process 500, the known type of input information includes authentication information, contact information, or payment information.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with enabling secure auto-filling of information, according to various aspects of the present disclosure. In some aspects, the process 600 may be performed by a memory and/or a processor/controller (e.g., processing unit 116, processor 720) associated with a user device/endpoint (e.g., user device 102) executing a security application and/or an extension application. As shown by reference numeral 610, process 600 may include receiving, from an infrastructure device, a trained machine learning (ML) model to enable the user device to determine a given type of input information to be auto-fill in an observed field portion in an observed network element. For instance, the user device may utilize an associated communication interface (e.g., communication interface 770) with the associated memory and/or processor to receive, from an infrastructure device, a trained machine learning (ML) model to enable the user device to determine a given type of input information to be auto-fill in an observed field portion in an observed network element, as discussed elsewhere herein.

As shown by reference numeral 620, process 600 may include analyzing, by the user device, an observed source code associated with an observed network element to determine an observed characteristic associated with an observed field portion that is configured to accept the given type of input information. For instance, the user device may utilize the associated memory and/or processor to analyze an observed source code associated with the observed network element to determine an observed characteristic associated with the observed field portion that is configured to accept the given type of input information, as discussed elsewhere herein.

As shown by reference numeral 630, process 600 may include calculating, by the user device, an observed signature associated with the observed field portion based at least in part on the observed characteristic. For instance, the user device may utilize the associated memory and/or processor to calculate an observed signature associated with the observed field portion based at least in part on the observed characteristic, as discussed elsewhere herein.

As shown by reference numeral 640, process 600 may include utilizing, by the user device, the trained machine learning model to evaluate the observed signature to determine the given type of input information. For instance, the user device may utilize the associated memory and/or processor to utilize the trained ML model to evaluate the observed signature to determine the given type of input information, as discussed elsewhere herein.

As shown by reference numeral 650, process 600 may include auto-filling, by the user device in the observed field portion, input information in accordance with the given type of input information. For instance, the user device may utilize the associated memory and/or processor to auto-fill, in the observed field portion, input information in accordance with the given type of input information, as discussed elsewhere herein.

Process 600 may include additional aspects, such as any single aspect or any combination of aspects described below and/or in connection with one or more other processes described elsewhere herein.

In a first aspect, in process 600, analyzing the observed source code to determine the observed characteristic includes analyzing a label associated with the observed field portion in the observed source code.

In a second aspect, alone or in combination with the first aspect, in process 600, analyzing the observed source code to determine the observed characteristic includes analyzing a structure of the observed field portion in the observed source code, the structure indicating that the observed field portion is configured to accept the given type of input information as a combination of alphanumerical characters and special characters.

In a third aspect, alone or in combination with the first through second aspects, in process 600, analyzing the observed source code to determine the observed characteristic includes analyzing a structure of the observed field portion in the observed source code, the structure indicating that the observed field portion is configured to accept the given type of input information as a selection of an option from a list of options.

In a fourth aspect, alone or in combination with the first through third aspects, in process 600, analyzing the observed source code to determine the observed characteristic includes analyzing a structure of the observed field portion in the observed source code, the structure indicating that the observed field portion is configured to accept the given type of input information as upload information.

In a fifth aspect, alone or in combination with the first through fourth aspects, in process 600, the observed network element includes a webpage or a web application available on the Internet.

In a sixth aspect, alone or in combination with the first through fifth aspects, in process 600, the given type of input information includes authentication information, contact information, or payment information.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700 associated with enabling secure auto-filling of information, according to various aspects of the present disclosure. In some aspects, the example devices 700 may form part of or implement the systems, servers, environments, infrastructures, components, devices, or the like described elsewhere herein (e.g., CSP control infrastructure) and may be used to perform example processes described elsewhere herein. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:
    an infrastructure device; and
    a user device, wherein
    the infrastructure device is configured to:
        analyze a source code associated with a known network element to determine a characteristic associated with an included field portion that is configured to accept a known type of input information;
        determine a correlation between the determined characteristic and the known type of input information;
        calculate, based at least in part on the correlation, a training signature that uniquely indicates a classification of the field portion as a field portion that accepts the known type of input information;
        train a machine learning (ML) model based at least in part on utilizing the training signature as training data; and
        transmit, to the user device, a trained ML model, and
    the user device is configured to:
        analyze an observed source code associated with an observed network element to determine an observed characteristic associated with an observed field portion that is configured to accept a given type of input information;
        calculate an observed signature associated with the observed field portion based at least in part on the observed characteristic;
        utilize the trained machine learning model to evaluate the observed signature to determine the given type of input information; and
        auto-fill, in the observed field portion, input information in accordance with the given type of input information.

2. The system of claim 1, wherein, to analyze the source code to determine the characteristic, the infrastructure device is configured to analyze a label associated with the field portion in the source code.

3. The system of claim 1, wherein, to analyze the source code to determine the characteristic, the infrastructure device is configured to analyze a structure of the field portion in the source code, the structure indicating that the field portion is configured to accept the known type of input information as a combination of alphanumerical characters and special characters.

4. The system of claim 1, wherein, to analyze the source code to determine the characteristic, the infrastructure device is configured to analyze a structure of the field portion in the source code, the structure indicating that the field portion is configured to accept the known type of input information as a selection of an option from a list of options.

5. The system of claim 1, wherein, to analyze the source code to determine the characteristic, the infrastructure device is configured to analyze a structure of the field portion in the source code, the structure indicating that the field portion is configured to accept the known type of input information as upload information.

6. The system of claim 1, wherein the known network element or the observed network element includes a webpage or a web application available on the Internet.

7. The system of claim 1, wherein the known type of input information includes authentication information, contact information, or payment information.

8. A method, comprising:
    analyzing, by an infrastructure device, a source code associated with a known network element to determine a characteristic associated with an included field portion that is configured to accept a known type of input information;
    determining, by the infrastructure device, a correlation between the determined characteristic and the known type of input information;
    calculating, by the infrastructure device based at least in part on the correlation, a training signature that uniquely indicates a classification of the field portion as a field portion that accepts the known type of input information;
    training, by the infrastructure device, a machine learning (ML) model based at least in part on utilizing the training signature as training data;
    transmitting, by the infrastructure device to a user device, a trained ML model;
    analyzing, by the user device, an observed source code associated with an observed network element to determine an observed characteristic associated with an observed field portion that is configured to accept a given type of input information;
    calculating, by the user device, an observed signature associated with the observed field portion based at least in part on the observed characteristic;
    utilizing, by the user device, the trained machine learning model to evaluate the observed signature to determine the given type of input information; and
    auto-filling, by the user device in the observed field portion, input information in accordance with the given type of input information.

9. The method of claim 8, wherein analyzing the source code to determine the characteristic includes the infrastructure device analyzing a label associated with the field portion in the source code.

10. The method of claim 8, wherein analyzing the source code to determine the characteristic includes the infrastructure device analyzing a structure of the field portion in the source code, the structure indicating that the field portion is configured to accept the known type of input information as a combination of alphanumerical characters and special characters.

11. The method of claim 8, wherein analyzing the source code to determine the characteristic includes the infrastructure device analyzing a structure of the field portion in the source code, the structure indicating that the field portion is configured to accept the known type of input information as a selection of an option from a list of options.

12. The method of claim 8, wherein analyzing the source code to determine the characteristic includes the infrastructure device analyzing a structure of the field portion in the source code, the structure indicating that the field portion is configured to accept the known type of input information as upload information.

13. The method of claim 8, wherein the known network element or the observed network element includes a webpage or a web application available on the Internet.

14. The method of claim 8, wherein the known type of input information includes authentication information, contact information, or payment information.

15. A non-transitory computer-readable medium configured to store instructions,
which when executed by an infrastructure device, configure the infrastructure device to:
analyze a source code associated with a known network element to determine a characteristic associated with an included field portion that is configured to accept a known type of input information;
determine a correlation between the determined characteristic and the known type of input information;
calculate, based at least in part on the correlation, a training signature that uniquely indicates a classification of the field portion as a field portion that accepts the known type of input information;
train a machine learning (ML) model based at least in part on utilizing the training signature as training data; and
transmit, to a user device, a trained ML model, and which when executed by the user device, configure the user device to:
analyze an observed source code associated with an observed network element to determine an observed characteristic associated with an observed field portion that is configured to accept a given type of input information;
calculate an observed signature associated with the observed field portion based at least in part on the observed characteristic;
utilize the trained machine learning model to evaluate the observed signature to determine the given type of input information; and
auto-fill, in the observed field portion, input information in accordance with the given type of input information.

16. The non-transitory computer-readable medium of claim 15, wherein, to analyze the source code to determine the characteristic, the infrastructure device is configured to analyze a label associated with the field portion in the source code.

17. The non-transitory computer-readable medium of claim 15, wherein, to analyze the source code to determine the characteristic, the infrastructure device is configured to analyze a structure of the field portion in the source code, the structure indicating that the field portion is configured to accept the known type of input information as a combination of alphanumerical characters and special characters.

18. The non-transitory computer-readable medium of claim 15, wherein, to analyze the source code to determine the characteristic, the infrastructure device is configured to analyze a structure of the field portion in the source code, the structure indicating that the field portion is configured to accept the known type of input information as a selection of an option from a list of options.

19. The non-transitory computer-readable medium of claim 15, wherein, to analyze the source code to determine the characteristic, the infrastructure device is configured to analyze a structure of the field portion in the source code, the structure indicating that the field portion is configured to accept the known type of input information as upload information.

20. The non-transitory computer-readable medium of claim 15, wherein the known network element or the observed network element includes a webpage or a web application available on the Internet.

* * * * *